Figure 1:
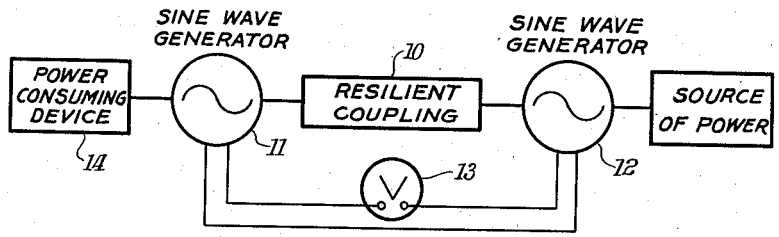

Jan. 8, 1952  C. R. MOORE  2,582,145
TRANSMISSION DYNAMOMETER
Filed July 18, 1947

Inventor
Charles R. Moore
By
John F. Wearden
Agent

Patented Jan. 8, 1952

2,582,145

UNITED STATES PATENT OFFICE 2,582,145

TRANSMISSION DYNAMOMETER

Charles R. Moore, Millburn, N. J., assignor to Marlow Pumps, Incorporated, Ridgewood, N. J., a corporation of New Jersey Application July 18, 1947, Serial No. 761,864

4 Claims. (Cl. 73—136)

The present invention relates to improvements in transmission dynamometers. In particular, this invention comprehends an improved method and means for measurement of the deflection angle which exists between coupled electromotive force generators in apparatus of this description.

A pair of generators, coupled by a suitable resilient spring, and interposed between a source of power and a power consuming device is a well known expedient in the art of torque and power measurement. Apparatus of this description is treated in my co-pending application for Letters Patent of the United States, Serial Number 752,812, filed June 5, 1947. In my above mentioned application I describe an improved dynamometer for measuring power with sine wave generators coupled by a resilient spring member, the torque versus deflection characteristics of the spring following the same law of mathematics as the resultant voltage output of the sine wave generators in series opposition, thus providing for accurate power measurement with a simple voltmeter.

No satisfactory means has, to my knowledge, been found for accurately measuring angular phase displacement for such sine wave generators while the generators are in motion and transmitting power, from which a measurement of torque may be had. In U. S. Patent Number 2,270,760 to Mershon, issued January 20, 1942, a theory is advanced wherein, with the use of coupled generators, it is considered that by reading the current in a purely inductive circuit the resultant voltage due to speed changes may be eliminated and one may obtain a quantity which is proportional to torque. Accordingly, this inventor employs a measurement instrument in circuit with an inductive element connected in series with the two generators in series opposition to obtain a reading of the torque transmitted, which reading is independent of speed changes in the generators.

In this arrangement, however, and while the measurement taken of the current flowing in the circuit is also a measure of the angle, the current, from the nature of the device, will be very small. The voltage applied to the circuit varies from zero to some value proportional to the highest power transmitted, and it is a well known fact that such a circuit will give substantially a constant current, in cases where applied voltage is proportional to the frequency. Hence, the means necessary to measure such current accurately will not be simple.

My invention comprehends an arrangement whereby the range of voltage is cut down by the use of two circuits, each having full generator voltage applied to it. The voltage which I read, which is proportional to the angle of torque, is the vector sum of two voltage drops taken around non-inductive resistances. In this manner I obtain a greater degree of accuracy than is possible with the single circuit arrangement of the patent noted above.

Accordingly, the principal object of my invention is to provide a method and apparatus for precisely measuring the angular deflection between electromotive force generators while they are in operation as components of a transmission dynamometer. Other and ancillary objects of the invention will become apparent as the description of the invention proceeds, taken in conjunction with the drawing which forms a part of this specification.

Figure 2:
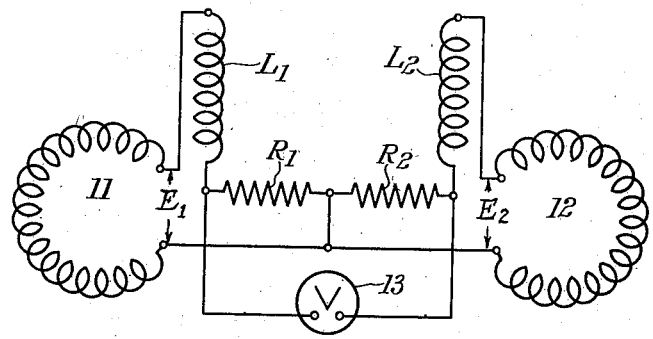
Figure 3:
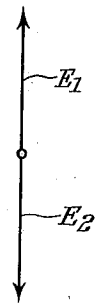
Figure 4:
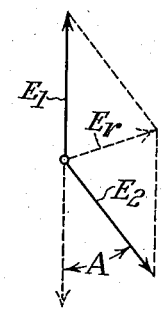

In the drawing:

Figure 1 is a diagrammatic view of the general arrangement of elements of a transmission dynamometer employing coupled electromotive force generators in series, Figure 2 is a schematic electrical circuit diagram showing principles of my invention, and Figures 3 and 4 are vector diagrams used in the analysis of the invention.

A transmission dynamometer with which my invention may be used is shown diagrammatically in Figure 1, wherein the numeral 10 indicates a resilient coupling interposed between a pair of pure sine wave generators 11 and 12. The generators are constructed so that their voltage output, $E_1$ and $E_2$ respectively, are identical and they are arranged in series opposition 180° out of phase whereby, with no power consuming load, the resultant voltage output at voltmeter 13 is zero. Likewise, the generators, and also the coupling member 10, are constructed according to my prior application whereby the law of electrical output from the generators follows the law of torque versus deflection in the coupling. When a load is applied as at 14, resulting in angular deflection in the coupling, a direct reading of power transmitted to the load may be taken with a simple voltmeter. Voltages which are developed in the sine wave generators, in addition to being equal, are also proportional to the generator speed. It is obvious that the frequency of the generators is also proportional to the speed and is the same for both generators.

This being the case, we may write:

$$E_1 = E_2 = K_1 S = K_2 F \qquad (1)$$

where:

$E_1$ and $E_2$ are generator voltages
S = speed
F = frequency
$K_1$ and $K_2$ are constants To the terminals of generator 11, Figure 2, we may now add an inductive circuit $L_1$ $R_1$ and to the terminals of generator 12 an inductive circuit $L_2$ $R_2$. These may be designated as circuit 1 and circuit 2 respectively, and suitable switching means may be used to connect and disconnect these circuits at will in the arrangement of Figure 1. The following equations will apply equally to both circuits.

$$I_1 = \frac{E_1}{Z_1} = \frac{E_1}{\sqrt{R_1^2 + X_1^2}} = \frac{E_1}{\sqrt{R_1^2 + (2\pi F L_1)^2}} \quad (2)$$

where:
$Z_1$ = impedance
$X_1$ = reactance
$L_1$ = inductance

From Equation 1 above, $E_1 = K_2 F$, which when substituted in Equation 2 gives:

$$I_1 = \frac{K_2 F}{\sqrt{R_1^2 + (2\pi F L_1)^2}} \quad (3)$$

If now $L_1$ be made large, and $R_1$ be kept relatively small, we may consider that $R_1^2$ is a negligible quantity as compared to $(2\pi F L_1)^2$, and we may write:

$$I_1 = \frac{K_2 F}{2\pi F L_1} = \frac{K_2}{2\pi L_1} \quad (4)$$

The foregoing demonstrates that current $I_1$ remains constant regardless of generator speed, just as long as $R_1$ has negligible effect on circuit 1. To illustrate a practical case, the following data may be assumed.

F = 10 cycles per second
$L_1$ = 40 henries
$E_1$ = 22.5 volts
S = 600 R. P. M.
$R_1$ = 60 ohms, total circuit resistance From Equation 1, $$K_2 = \frac{22.5}{10} = 2.25$$

Using these values in Equation 4, we have:

$$I_1 = \frac{2.25}{6.28 \cdot 40}$$
$$= .008957$$

Substituting the data given in the exact Equation 3 for comparison with the above result, we have:

$$I_1 = \frac{2.25 \cdot 10}{\sqrt{60^2 + (2\pi 10 \cdot 40)^2}}$$
$$= \frac{2.25 \cdot 10}{\sqrt{3600 + 6{,}310{,}144}}$$
$$= .008954 \text{ ampere}$$

From this we see that the effect of resistance is negligible, and for higher frequencies the equalization will be more pronounced, so that no important error is involved in using Equation 4 and regarding I as constant. It follows that $E_1 = I_1 R_1$ and $E_2 = I_2 R_2$, both constant.

In practice, the voltages of generators 11 and 12 are in exact opposition when the mechanical spring 10 is unstressed, as when no torque is being transmitted. This means that $I_1$ and $I_2$ are exactly opposite in phase also since $L_1$ equals $L_2$ and $R_1$ equals $R_2$. Therefore, the voltage drop across the two resistances $R_1$ and $R_2$ in series for this condition is zero, and this would be the reading on voltmeter 13, connected as shown in Figure 2. The vector diagram showing this is given in Figure 3.

If now, torque is transmitted, as when a power consuming load 14, Figure 1, is coupled with the dynamometer, the spring 10 deflects allowing the generators 11 and 12 to depart from exact phase opposition by an angle A. The two currents $I_1$ and $I_2$ will change their phase relationship by the same angle A, as shown in Figure 4. A resultant voltage $E_r$ will appear on voltmeter 13, which is equal to:

$$E_r = 2E_1 \sin A/2$$
$$= K \sin A/2$$

where K is a constant.

Then, by placing an additional scale on voltmeter 13, or by using a calibration curve, the value of the angular deflection of the resilient spring 10 is obtained at any speed and for any torque.

It will be noted that the resistance and the reactance of the generators themselves have been neglected in the foregoing discussions. Both of these values are small and are avoided for the sake of clarity. Generator resistance is not affected by speed and frequency and may be taken care of by calibration. Generator reactance is, however, a function of frequency. The inductances $L_1$ and $L_2$ are each approximately four thousand times the inductance of the associated generator, so that neglect of the generator inductance has little bearing on the results obtained.

I claim:

1. In a transmission dynamometer, in combination, a pair of sine wave generators, resilient mechanical coupling means between the generators, and electrical coupling means for the generators, said electrical coupling means including an inductive circuit in series with the terminals of each generator comprising an inductance and a resistance, said resistance having a negligible value relative to the value of said inductance, the inductance and resistance associated with each generator being further connected in series with each other as well as the generator terminals, and the generator terminals connected to the resistances in the inductive circuits being further interconnected with each other, whereby a reading of the combined voltage drop across the resistances in series is proportional to the angular deflection between the generators.

2. A transmission dynamometer comprising, in combination, a source of power, a pair of sine wave generators driven by the power source and mechanically connected through a resilient coupling having torque versus deflection characteristics proportional to half of the angle of torsional displacement, and electrical coupling means for the generators, said electrical coupling means including an inductive circuit in series with the terminals of each generator comprising an inductance and a resistance, said resistance having a negligible value relative to the value of said inductance, the inductance and resistance associated with each generator being further connected in series with each other as well as the generator terminals, and the generator terminals connected to the resistances in the inductive circuits being further interconnected with each other, whereby a reading of voltage drop across resistances in the inductive circuits may be taken which is proportional to the angular deflection between the generators.

3. In a transmission dynamometer, in combination, a pair of sine wave generators, a source of power for the generators, a resilient coupling between the generators, an inductive circuit in series with the terminals of each generator comprising an inductance and a resistance, said resistance having a negligible value relative to the value of said inductance, the inductance and resistance associated with each generator being further connected in series with each other as well as the generator terminals, and the generator terminals connected to the resistances in the inductive circuits being further interconnected with each other, and a voltmeter to measure the combined voltage drop taken around non-inductive resistances in the inductive circuits.

4. In a power and torque meter, in combination, a pair of sine wave generators, driving means for the generators, a resilient coupling between the generators having torque versus deflection characteristics which follow the same law as that of the resultant electromotive force output of the generators, and means to measure the combined electromotive force output of the generators for a measurement of power, including inductive circuits connectible with the terminals of each generator comprising an inductance and a resistance, said resistance having a negligible value relative to the value of said inductance, the inductance and resistance associated with each generator being further connected in series with each other as well as the generator terminals, and the generator terminals connected to the resistances in the inductive circuits being further interconnected with each other, whereby a reading of the combined voltage drop around non-inductive resistances in the inductive circuit will be proportional to the angular deflection therebetween.

CHARLES R. MOORE.

REFERENCES CITED

The following references are of record in the file of this patent:

UNITED STATES PATENTS

| Number | Name | Date |
| --- | --- | --- |
| 1,685,964 | Smith et al. | Oct. 2, 1928 |
| 2,232,525 | Hall et al. | Feb. 18, 1941 |
| 2,270,760 | Mershon | Jan. 20, 1942 |
| 2,346,976 | Langer et al. | Apr. 18, 1944 |

FOREIGN PATENTS

| Number | Country | Date |
| --- | --- | --- |
| 559,116 | Great Britain | Feb. 4, 1944 |